No. 615,473.  A. J. BOYCE.  Patented Dec. 6, 1898.
HORSE POWER.
(Application filed Feb. 28, 1896.)
(No Model.)
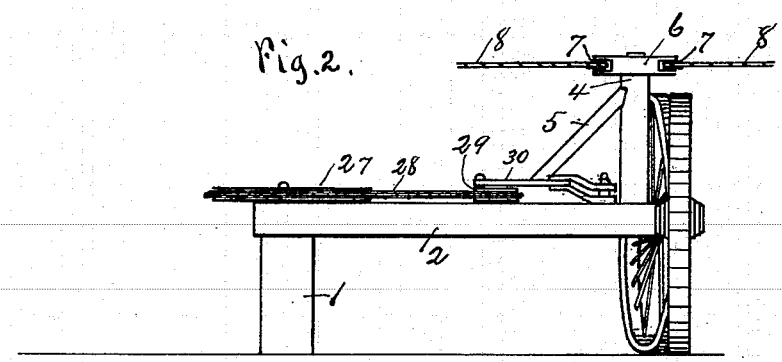
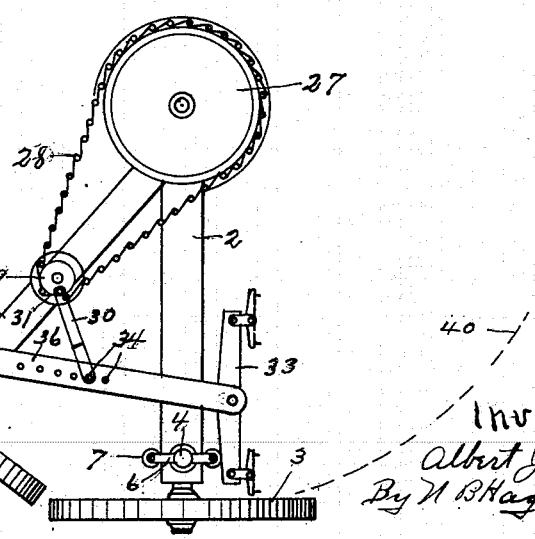

UNITED STATES PATENT OFFICE.

ALBERT J. BOYCE, OF AUGUSTA, OKLAHOMA TERRITORY.

HORSE-POWER.

SPECIFICATION forming part of Letters Patent No. 615,473, dated December 6, 1898.

Application filed February 28, 1896. Serial No. 581,218. (No model.)

*To all whom it may concern:*

Be it known that I, ALBERT J. BOYCE, a citizen of the United States of America, residing at Augusta, in the county of Woods and Territory of Oklahoma, have invented certain new and useful Improvements in Horse-Powers, of which the following is a specification, reference being had therein to the accompanying drawings, and the figures of reference thereon, forming a part of this specification, in which—

Figure 1 is a top plan of my improved horse-power. Fig. 2 is a side view of the same.

This invention relates to certain improvements in horse-powers; and it consists in the construction of a horse-power having a means for equalizing the draft through the medium of the sprocket wheels and chain connected to the doubletrees by the pitman, as shown.

Referring to the drawings, 1 represents a center support which is secured in the ground.

2 represents a horse-power frame which is journaled at one end to the support 1 and supported at the outer end by the wheels 3. 4 represents a standard which is secured to the outer end of said frame 2 and is held rigid by the braces 5. Said standard 4 is provided with a pulley-frame 6, in which the pulleys 7 are journaled.

27 represents a sprocket-wheel permanently secured to the post 1.

28 represents a sprocket-chain which connects the sprocket-wheel 27 to the sprocket-pinion 29.

30 represents a pitman which is pivotally secured to the pinion 29 at 31, with the opposite end adjustably secured to the arm 36. The holes 34 are for the purpose of adjusting the said pitman 30.

33 represents doubletrees for attaching a team of horses to said horse-power.

40 represents the line of travel of the horses while operating said horse-power.

The horse-power is used in the following manner: A team of horses is hitched to the horse-power and driven around in a circle, as indicated by the dotted lines 40. The arm 36, carrying the doubletrees, is movable backward and forward through the medium of the sprocket wheels and chain, so that at certain points around the circle 40 there will be a greater leverage than at others, to be used in cases where the strain is greater at one place than another.

Having thus described my invention, what I claim as new and useful, and desire to secure by Letters Patent, is as follows:

The herein-described horse-power consisting of the combination of a stationary post, a frame with the inner end journaled thereto, two wheels for supporting the outer end of said frame, and carrying the same around in a circle, an equalizing mechanism consisting of a sprocket-wheel journaled to said stationary post, a smaller sprocket-wheel journaled to said frame, a sprocket-chain connecting said sprocket-wheels, a pitman, one end secured to said smaller wheel, an equalizing-arm to which the opposite end of said pitman is secured, and a doubletree secured to one end of said arm, an upright post secured to the outer end of said frame having a pulley-frame secured to its upper end, pulleys journaled in said frame for carrying the draft-rope 8.

ALBERT J. BOYCE.

Witnesses:
E. W. ROBINS,
W. R. PEACOCK.